United States Patent
Guo et al.

(10) Patent No.: US 9,154,448 B2
(45) Date of Patent: Oct. 6, 2015

(54) APPARATUS AND METHOD FOR SWITCHING CONNECTION TO A COMMUNICATION NETWORK

(75) Inventors: Zhaogong Guo, Koto (JP); Kazuaki Nimura, Kawasaki (JP); Yosuke Nakamura, Kawasaki (JP); Koichi Yasaki, Kawasaki (JP); Hidenobu Ito, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 144 days.

(21) Appl. No.: 13/431,010

(22) Filed: Mar. 27, 2012

(65) Prior Publication Data

US 2012/0269193 A1 Oct. 25, 2012

(30) Foreign Application Priority Data

Mar. 31, 2011 (JP) ................................. 2011-081139

(51) Int. Cl.
*H04L 12/931* (2013.01)
(52) U.S. Cl.
CPC ....................................... *H04L 49/35* (2013.01)
(58) Field of Classification Search
USPC .......................................................... 370/389
See application file for complete search history.

(56) References Cited

U.S. PATENT DOCUMENTS

| | | | | |
|---|---|---|---|---|
| 5,530,932 | A * | 6/1996 | Carmean et al. | 713/324 |
| 6,397,305 | B1 * | 5/2002 | Knight et al. | 711/147 |
| 6,914,898 | B2 * | 7/2005 | Sasagawa et al. | 370/352 |
| 7,170,851 | B1 * | 1/2007 | Chen et al. | 370/222 |
| 7,286,502 | B1 * | 10/2007 | Rao et al. | 370/328 |
| 7,796,585 | B2 * | 9/2010 | Celebioglu et al. | 370/356 |
| 7,924,791 | B2 * | 4/2011 | Ianos | 370/338 |
| 8,014,387 | B2 * | 9/2011 | Arimilli et al. | 370/353 |
| 8,355,407 | B2 * | 1/2013 | Wookey et al. | 370/401 |
| 2002/0032844 | A1* | 3/2002 | West | 711/171 |
| 2004/0088599 | A1* | 5/2004 | Matsui et al. | 713/600 |
| 2006/0098660 | A1* | 5/2006 | Pal et al. | 370/395.51 |

(Continued)

FOREIGN PATENT DOCUMENTS

| | | | |
|---|---|---|---|
| JP | 10-145456 | * | 5/1998 |
| JP | 2004-147251 | | 5/2004 |
| JP | 2005-45301 | | 2/2005 |

OTHER PUBLICATIONS

Japanese Office Action issued Dec. 2, 2014 in corresponding Japanese Patent Application No. 2011-081139.

*Primary Examiner* — Ian N Moore
*Assistant Examiner* — Lakeram Jangbahadur
(74) *Attorney, Agent, or Firm* — Staas & Halsey LLP (57) ABSTRACT

An apparatus includes first and second processors, a common memory, and a switch. The first processor executes an operating system, connects to a communication network and communicates with the communication network. The second processor operates independently of the operating system, connects to the communication network, and communicates with the communication network. The second processor writes, in the common memory, communication setting information being used by the second processor when the switch switches the connection destination from the second processor to the first processor. The first processor acquires the communication setting information, and sets the acquired communication setting information to the first processor. The switch switches the connection destination of the communication network from the second processor to the first processor after the communication setting information has been set to the first processor.

5 Claims, 7 Drawing Sheets

(56) References Cited

U.S. PATENT DOCUMENTS

| | | |
|---|---|---|
| 2008/0062996 A1* | 3/2008 | Kaippallimalil et al. .. 370/395.1 |
| 2008/0189500 A1* | 8/2008 | Jennings et al. ............. 711/164 |
| 2008/0240093 A1* | 10/2008 | Morad et al. .................. 370/389 |
| 2008/0276232 A1* | 11/2008 | Aguilar et al. ................ 717/149 |
| 2009/0161533 A1* | 6/2009 | Ballantyne et al. ........... 370/218 |
| 2009/0204770 A1* | 8/2009 | Jeong ............................ 711/147 |
| 2010/0002647 A1* | 1/2010 | Ahn et al. ..................... 370/329 |
| 2011/0151910 A1* | 6/2011 | Kim et al. ..................... 455/509 |
| 2012/0033643 A1* | 2/2012 | Noh et al. ..................... 370/335 |
| 2012/0033650 A1* | 2/2012 | Ahn et al. ..................... 370/336 |
| 2012/0263125 A1* | 10/2012 | Tejaswini et al. ............. 370/329 |

* cited by examiner

APPARATUS AND METHOD FOR SWITCHING CONNECTION TO A COMMUNICATION NETWORK

CROSS-REFERENCE TO RELATED APPLICATION

This application is based upon and claims the benefit of priority of the prior Japanese Patent Application No. 2011-081139, filed on Mar. 31, 2011, the entire contents of which are incorporated herein by reference.

FIELD

The embodiment discussed herein is related to an apparatus and method for switching connection to a communication network.

BACKGROUND

Recently, a push data distribution service which distributes information to a terminal unit from a server is becoming popular. Such a service is called a PUSH service. In the PUSH service, a terminal unit may receive information automatically whenever the information is delivered from a server, regardless that the terminal unit stays in a power-on state or not or that the terminal unit is connected to a communication network or not.

In order to implement such a service, a terminal unit provided with a remote-controlled communication device has been proposed where the remote-controlled communication device manages the power supply for the terminal unit by waiting for user manipulation. The remote-controlled communication device is provided with its own central processing unit (CPU) and thus may perform, for example, power control of the terminal unit independently from the control caused by the CPU of the terminal unit. Hereinafter, components controlled by the CPU of the terminal unit will be collectively called a "terminal unit main body", and a state in which the terminal unit main body is in a power-off state will be also expresses as "the terminal unit is in a power-off state" meaning that the terminal unit main body is in a power-off state.

The remote-controlled communication device operates to achieve its own function even when the terminal unit is in a power-off state. Since the remote-controlled communication device operates even when the terminal unit is in a power-off state, the remote-controlled communication device consumes the power at all times. In order to reduce the power consumption, the remote-controlled communication device is usually implemented by a low power consumption circuit using a micro processing unit (MPU) which operates at several or several tens of MHz. Further, the remote-controlled communication device may be connected to a communication network by connecting itself to a communication device via an interface such as a universal serial bus (USB).

With the remote-controlled communication device staying energized at all times, a PUSH service, such as transmitting a push notification and downloading a file, may be provided even when the terminal unit is in a power-off state.

However, since the remote-controlled communication device is implemented at a low clock rate, a transmission device included in the remote-controlled communication device may not be operated at a sufficient transmission rate compared to a transmission device included in the terminal unit main body. When the terminal unit is in a power-off state, that is, the terminal unit main body is in a power-off state, data transmission at a low rate does not affect the operation of the terminal unit since there exist no processes being performed in the terminal unit main body.

On the other hand, when the terminal unit is in a power-on state, that is, the terminal unit main body is in a power-on state, an operator may manipulate the terminal unit so that the terminal unit main body performs some processes. In such a situation, the low transmission rate may cause delay in response, thereby making it difficult to satisfy a requirement of the operator. It is therefore desirable to avoid a situation in which the terminal unit main body acquires data via the remote-controlled communication device when the terminal unit, that is, the terminal unit main body is in a power-on state.

In order to address this problem, a method has been proposed in which, for example, when connection between the terminal unit and a communication device is established via a USB interface, a USB bus capable of connecting the communication device to each of the terminal unit main body and the remote-controlled communication device is selectively switched using a USB bus switch so that one of the terminal unit main body and the remote-controlled communication device is selected as a USB host. This method allows a terminal unit equipped with a remote-controlled communication device to perform always-on connection to a communication network without any reduction in transmission speed.

A related art is proposed in which, in a redundant communication control system, data is saved in a common memory shared by both an active system and a standby system, and the standby system takes over communication control processing from the active system by referring to the common memory at the time of switching the active and standby systems. Another related art is proposed in which any of a plurality of processing circuits provided in a terminal unit is selected to perform protocol processing by switching a bus.

Japanese Laid-open Patent Publication No. 10-145456 and Japanese Laid-open Patent Publication No. 2004-147251 are examples of the related art.

SUMMARY

According to an aspect of the invention, an apparatus includes first and second processors, a common memory, and a switch. The first processor executes an operating system, connects to a communication network, and communicates with the communication network. The second processor operates independently of the operating system, connects to the communication network, and communicates with the communication network. The common memory stores communication setting information. The switch switches a connection destination of the communication network from one of the first and second processors to the other one of the first and second processors. The second processor writes, in the common memory, the communication setting information being used by the second processor when the switch switches the connection destination from the second processor to the first processor. The first processor acquires the communication setting information that has been written in the common memory by the second processor, and sets the acquired communication setting information to the first processor. The switch switches the connection destination of the communication network from the second processor to the first processor after the first processor has set the communication setting information of the second processor to the first processor.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

According to the related art mentioned above, a USB host is switched from any one of the terminal unit main body and the remote-controlled communication device to another using a USB bus switch. However, this means a physical manipulation in which a USB device is detached from one of the terminal unit main body and the remote-controlled communication device, and then the USB device is attached to the other one of the terminal unit main body and the remote-controlled communication device. This causes the terminal unit to be physically disconnected from the communication network, and, after the switching from one of the terminal unit main body and the remote-controlled communication device to the other one of the terminal unit main body and the remote-controlled communication device is completed, the terminal unit is required to perform a USB enumeration process, establishment of the network connection, and connection to the server of an application. Therefore, the connection between the communication network and the terminal unit is temporarily interrupted. Such temporal interruption of the network connection due to the switching may impair the quality of a service to be provided, such as a PUSH service.

In the related art in which communication control is continued without interruption during the switching in the redundant communication control system, both of the communication control systems stay connected to a communication network. Therefore, there are no requirements for performing processes of detaching and attaching the communication device during the switching. In this related art, temporal interruption of the network connection caused by detaching and attaching the communication device is not considered. Therefore, it is difficult to avoid reduction in the quality of a service (such as the PUSH service) when detaching and attaching the communication device is required for some reasons. In the related art in which the buses are switched to cause any of the processing circuit to perform the protocol processing, temporal interruption in the network connection during the switching is not avoidable.

Hereinafter, embodiments of an information processing device and a method for controlling the information processing device will be described in detail with reference to the drawings. The embodiments are illustrative only and not restrictive.

Figure 1:
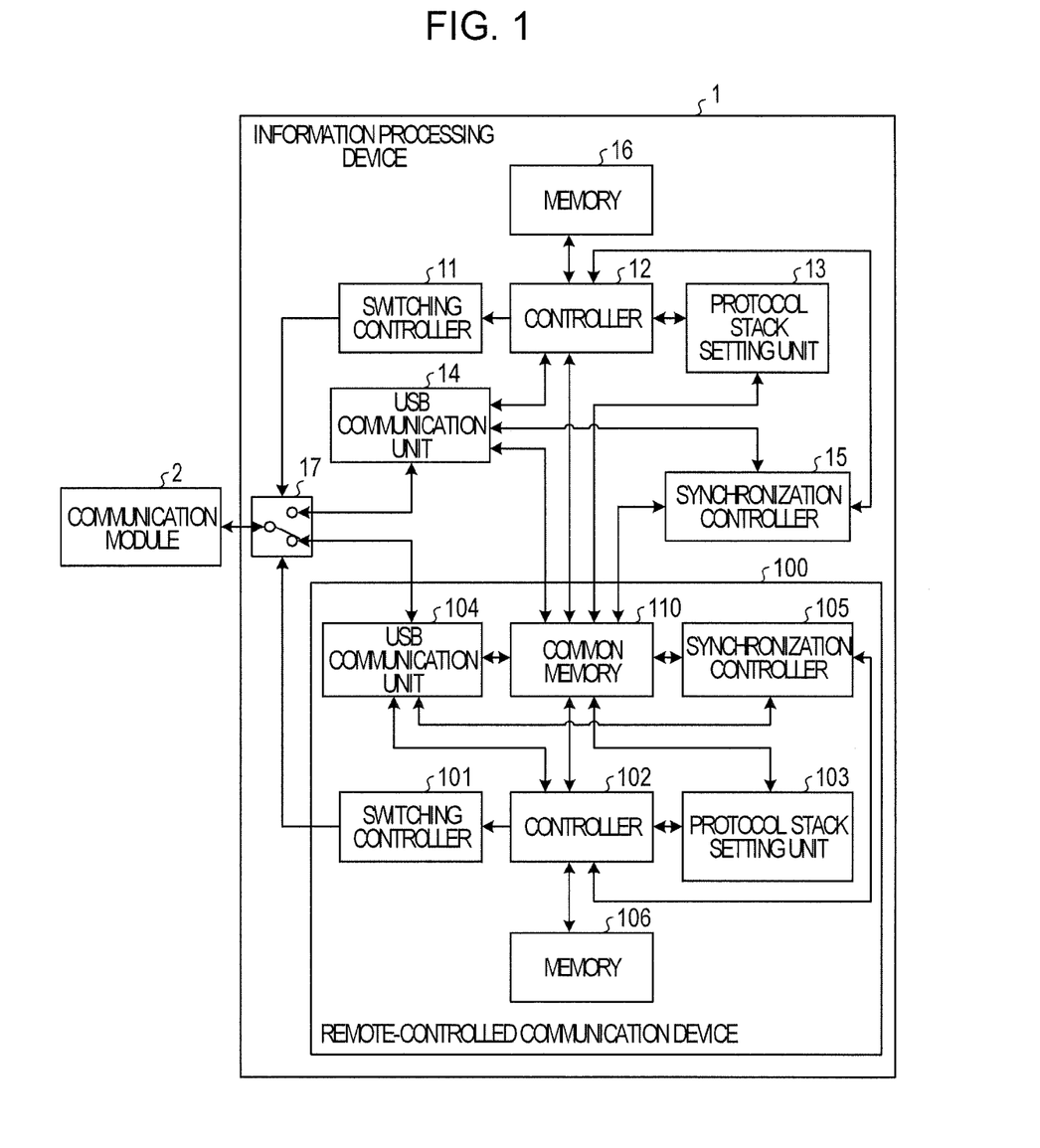
FIG. 1 is a diagram illustrating a configuration example of an information processing device, according to an embodiment.

FIG. 1 is a diagram illustrating a configuration example of an information processing device, according to an embodiment. As illustrated in FIG. 1, an information processing device 1 according to the embodiment includes a switching controller 11, a controller 12, a protocol stack setting unit 13, a USB communication unit 14, a synchronization controller 15, a memory 16, a switch 17 and a remote-controlled communication device 100. In the following description, components of the information processing device 1 except for the remote-controlled communication device 100 will be referred to as an "information processing device 1 main body."

The remote-controlled communication device 100 includes a switching controller 101, a controller 102, a protocol stack setting unit 103, a USB communication unit 104, a synchronization controller 105, a memory 106, and a common memory 110.

The switch 17 is connected to a USB device, such as a communication module 2 as illustrated in FIG. 1. Examples of the communication module 2 mentioned above include the Third Generation (3G), Long Term Evolution (LTE) and Worldwide Interoperability for Microwave Access (WiMAX) communication module. The communication module 2 is coupled to an external communication network (not depicted in FIG. 1) in the embodiment. In response to an instruction issued by the switch controller 11 or the switch controller 101, the switch 17 performs switching such that one of the USB communication unit 14 and the USB communication unit 104 is selectively connected to the communication module 2. That is, when the switch 17 selects the USB communication unit 14 as a connection destination of the communication module 2, data may be transmitted between the communication module 2 and the USB communication unit 14. When the switch 17 selects the USB communication unit 104 as the connection destination of the communication module 2, data may be transmitted between the communication module 2 and the USB communication unit 104.

Hereinafter, a switching operation in which a connection destination of the communication module 2 is switched from the USB communication unit 14 to the USB communication unit 104 by the switch 17 will be also simply expressed as "switching to the USB communication unit 104." Similarly, a switching operation in which a connection destination of the communication module 2 is switched from the USB communication unit 104 to the USB communication unit 14 by the switch 17 will be also simply expressed as "switching to the USB communication unit 14." Further, when the distinction between connection destinations of the communication module 2 is not required, the switching operation will be also simply expressed as "switching", a connection destination of the communication module 2 before the switching is performed will be also simply expressed as a "switching source" and a connection destination of the communication module 2 after the switching is performed will be also simply expressed as a "switching destination".

The common memory 110 is a storage unit, such as a memory. Data may be written in and read out from the common memory 110 by any component of the information processing device 1 main body and any component of the remote-controlled communication device 100.

Figure 2:
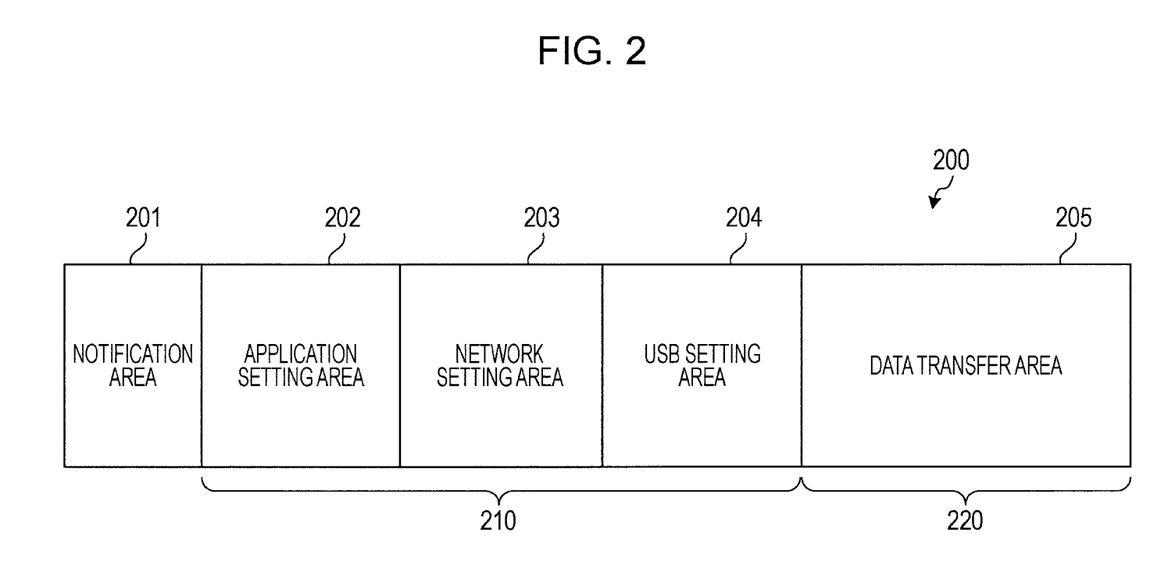
FIG. 2 is a diagram illustrating an example of a data format used for storing data in a common memory, according to an embodiment.

FIG. 2 is a diagram illustrating an example of a data format used for storing data in a common memory, according to an embodiment. In FIG. 2, a data format 200 of the data stored in the common memory 110 includes a notification area 201, a protocol stack setting area 210, and a synchronization area 220.

In the notification area 201, data such as a notification indicating an occurrence or completion of switching from a switching source to a switching destination is stored.

The protocol stack setting area 210 stores communication setting information for setting communication regarding each of protocol layers. The protocol stack setting area 210 includes an application setting area 202, a network setting area 203, and a USB setting area 204. As described below, the communication setting information stored in the protocol stack setting area 210 is information that is passed from the switching source to the switching destination when the switching is performed.

The application setting area 202 stores application information indicating setting information for setting each of applications. For example, the applications include an application that receives a PUSH service. The application information includes, for example, information on an authentication server, certification information, and device identifier information.

The network setting area 203 stores network information indicating setting information used for setting a communication link to a communication network. For example, the network information includes an Internet Protocol (IP) address, a port number, session management information, and an identifier (ID) and a password (PW) that are used for the Point-to-Point Protocol (PPP).

The USB setting area 204 stores USB information indicating setting information for setting a USB. The USB information includes, for example, a device address, information on an endpoint, and information on a device driver.

The synchronization area 220 stores information used for synchronizing operations of the information processing device 1 main body and the remote-controlled communication device 100 when performing the switching. The synchronization area 220 includes a data transfer area 205. In FIG. 2, for ease of description, the synchronization area 220 is depicted as the same area as the data transfer area 205. However, the data transfer area 205 may be included in the synchronization area 220 so that other information used for the synchronization is also be stored in the synchronization area 220.

The data transfer area 205 is used for transferring data received from the communication module 2, from the switching destination to the switching source.

Referring back to FIG. 1, when the switch 17 is selecting the USB communication unit 14 as a connection destination of the communication module 2, the USB communication unit 14 performs data transmission between the USB communication unit 14 and the communication module 2. For example, the USB communication unit 14 transmits data designated by the controller 12 to an external communication network via the communication module 2, and receives data from the external communication network via the communication module 2. The USB communication unit 14 outputs the received data to the controller 12. Here, the USB communication unit 14 synchronizes data transmission at an interval of 1 millisecond using a Start of Frame (SOF) packet. The SOF packet is stored at the head of a frame that is a unit of data transmission. That is, the transmission data is configured as a sequence of frames that are successively transmitted at the interval of 1 millisecond and each store a SOF packet at the head of the each frame. When a communication is required, the USB communication unit 14 performs data transmission by conveying USB transaction data using one or more frames.

Meanwhile, when the switch 17 is selecting the USB communication unit 104 as a connection destination of the communication module 2, the USB communication unit 14 does not perform data transmission.

In the case of the switching to the USB communication unit 104, the USB communication unit 14, upon receiving a notification requesting the switching from the controller 12, outputs data received from the communication module 2, to the synchronization controller 15 as well as to the controller 12.

Meanwhile, in the case of the switching to the USB communication unit 14, the USB communication unit 14 is reset, under control of the synchronization controller 15, at the time when the USB communication unit 104 receives a SOF. This allows the USB communication unit 14 to synchronize to the communication module 2. Then, the USB communication unit 14 is virtually connected to a virtual communication module that is a virtual module for virtualizing a communication module within the common memory 110, as will be described later. This allows the USB communication unit 14 to perform data transmission between the USB communication unit 14 and the virtual communication module implemented in the common memory 110.

The USB communication unit 14 receives from the controller 12 an instruction for sending a pseudo USB response to the virtual communication module. In response to this instruction, the USB communication unit 14 writes the pseudo USB response in the data transfer area 205 of the common memory 110. The USB communication unit 14 monitors the notification area 201 to determine whether a pseudo response has been written in the notification area 201 by the controller 102 of the remote-controlled communication device 100. When the pseudo response has been written in the notification area 201, the USB communication unit 14 reads the pseudo response from the notification area 201, and determines whether a communication link between the USB communication unit 14 and the virtual communication module has been normally established or not. When it is determined that the communication link has been established normally, the USB communication unit 14 issues a notification indicating the completion of synchronization to the controller 12.

In the case of the switching to the USB communication unit 104, the synchronization controller 15 receives a synchronization instruction from the controller 12. The synchronization controller 15 further receives, from the controller 12, a USB descriptor of the controlling the communication module 2. The synchronization controller 15 writes the received USB descriptor in the synchronization area 220 of the common memory 110 so that a virtual communication module is built within the common memory 110.

Next, the synchronization controller 15 receives, from the USB communication unit 14, data that was received from the communication module 2 by the USB communication unit 14. The synchronization controller 15 writes the received data in the data transfer area 205 of the common memory 110.

Meanwhile, in the case of the switching to the USB communication unit 14, the synchronization controller 15 receives a synchronization instruction from the controller 12. In response to the synchronization instruction from the controller 12, the USB communication unit 14 monitors the data transfer area 205 of the common memory 110. The synchronization controller 15 refers to a SOF of the data written in the data transfer area 205, resets the USB communication unit 14 at the time of receiving the SOF to synchronize the USB communication unit 14 to the communication module 2.

In the case of the switching to the USB communication unit 104, the protocol stack setting unit 13 receives an instruction to store communication setting information from the controller 12, and writes the communication setting information in the common memory 110. For example, the protocol-stack setting unit 13 writes, in the application setting area 202, application information that has been used in the communication using the communication module 2. Further, the protocol stack setting unit 13 writes, in the network setting area 203, network information that has been used by the USB communication unit 14 when communicating with an external communication network via the communication module 2. The protocol stack setting unit 13 writes USB information for the communication module 2, in the USB setting area 204.

Meanwhile, in the case of the switching to the USB communication unit 14, the protocol stack setting unit 13 receives, from the controller 12, an instruction to acquire communication setting information, and acquires, from the common memory 110, the communication setting information which has been used by the USB communication unit 104. For example, the protocol-stack setting unit 13 acquires, from the application setting area 202, the application information regarding an application performing data transmission using the communication module 2. The protocol stack setting unit 13 acquires, from the network setting area 203, the network information that has been used by the USB communication unit 104 when communicating with the external communication network via the communication module 2. The protocol-stack setting unit 13 acquires the USB information for the communication module 2, from the USB setting area 204. Then, the protocol-stack setting unit 13 outputs the acquired communication setting information to the controller 12.

The memory 16 is a storage unit, such as a memory and a hard disk. An OS and an application for providing a service such as a PUSH service are stored in the memory 16.

Next, description will be given of an operation of the controller 12 when the switch 17 is selecting the USB communication unit 14 as a connection destination of the communication module 2. The controller 12 inputs data from the USB communication unit 14, and processes the data using, for example, the memory 16. The controller 12 outputs the data to the USB communication unit 14 when the data is required to be transmitted to an external communication network.

When a switching factor (a factor causing the switching), such as the issuance of a shutdown instruction, has occurred in a state in which the switch 17 is selecting the USB communication unit 14 as a connection destination of the communication module 2, the controller 12 starts up the controller 102 that has been in a shutdown or standby mode. The controller 12 notifies the USB communication unit 14 of an instruction to perform the switching, and notifies the synchronization controller 15 of a synchronization instruction. Further, the controller 12 notifies protocol stack setting unit 13 of an instruction to store the communication setting information. The controller 12 writes the notification indicating the start of the switching in the notification area 201 of the common memory 110.

The controller 12 monitors the notification area 201 of the common memory 110, and determines whether a notification indicating the completion of setting synchronization has been written by the controller 102 of the remote-controlled communication device 100.

Then, the controller 12 monitors the synchronization area 220 of the common memory 110, and determines whether USB response information has been written by the USB communication unit 104 of the remote-controlled communication device 100. When the USB response information has been written in the synchronization area 220, the controller 12 writes pseudo response information in the synchronization area 220. Thereafter, the controller 12 monitors the notification area 201 of the common memory 110, and determines whether a notification indicating the completion of synchronization has been written by the controller 102. Further, the controller 12 monitors the notification area 201 of the common memory 110, and determines whether the notification requesting the switching has been written in the notification area 201. When the notifications indicating the completion of synchronization and the requesting the switching are written, the controller 12 outputs, to the switching controller 11, an instruction to switch a connection destination of the communication module 2 from the USB communication unit 14 to the USB communication unit 104.

Next, description will be given of an operation of the controller 12 when the switch 17 is selecting the USB communication unit 104 as the connection destination of the communication module 2. In this case, the controller 12 is in a shut down state under normal conditions. When a switching factor has occurred when the switch 17 is selecting the USB communication unit 104 as a connection destination of the communication module 2, electric power supply is started under control of the controller 102 of the remote-controlled communication device 100.

The controller 12 notifies the protocol stack setting unit 13 of an acquisition instruction to acquire communication setting information, and afterward receives the communication setting information from the protocol stack setting unit 13 as a response to the acquisition instruction.

The controller 12 acquires USB information from the received communication setting information and performs the setting of the USB communication unit 14 based on the acquired USB information. For example, the controller 12 builds, within the USB communication unit 14, a pseudo USB host using a USB device address, endpoint information, and a device driver information that has been used by the USB communication unit 104 so that the pseudo USB operates in the same manner as the USB host implemented by the USB communication unit 104.

The controller 12 acquires network information from the received communication setting information, and sets the acquired network information in the USB communication unit 14. For example, the acquired network information includes an IP address, a port number, session management and PPP connection information.

Further, the controller 12 acquires application information from the received communication setting information, and starts up an application relating to the acquired application information. The controller 12 applies the application information to the started application. For example, the controller 12 sets to the started application, as the application information, information on a PUSH server, certification information, and device identifier. Then, the controller 12 writes a notification indicating completion of setting the application in the notification area 201 of the common memory 110.

The controller 12 notifies the synchronization controller 15 of a synchronization instruction. The controller 12 determines whether the synchronization in the USB communication unit 14 has been completed. The controller 12 writes the notification indicating completion of synchronization in the notification area 201 when the synchronization of the USB communication unit 14 has been completed.

Thereafter, the controller 12 performs USB enumeration as to the communication module 2, and registers the USB device, where the controller 12 uses the same device address and endpoint information as those that were set in the USB communication unit 104.

Thereafter, the controller 12 acquires information on the USB descriptor from the synchronization area 220 of the common memory 110 to acquire specification information on the communication module 2. The controller 12 may create data for the communication module 2 using the USB descriptor of the communication module 2, and write the created data for the communication module 2 in the notification area 201 of the common memory 110. Further, the controller 12 may handle data acquired from the notification area 201 for the communication module 2 in the same manner as the data acquired from the communication module 2. Therefore, the controller 12 may behave as if it communicates with the communication module 2, using the common memory 110. That is, the controller 12 may use the common memory 110 as a virtual communication module.

The controller 12 notifies the USB communication unit 14 of an instruction to provide a pseudo USB response for the virtual communication module. When the notification indicating completion of synchronization is received from the USB communication unit 14, the controller 12 writes the notification requesting the switching in the notification area 201.

When the switching to the USB communication unit 14 is completed and the controller 14 receives data from the USB communication unit 14, the controller 12 starts processing on the received data, for example, using the started application and the like.

The switching controller 11 receives, from the controller 12, an instruction to switch a connection destination of the communication module 2 from the USB communication unit 14 to the USB communication unit 104. Then, the switching controller 11 controls the switch 17 to select the USB communication unit 104 as a connection destination of the communication module 2.

Hereinafter, description will be given of the remote-controlled communication device 100.

When the switch 17 is selecting the USB communication unit 104 as a connection destination of the communication module 2, the USB communication unit 104 performs data transmission between the USB communication unit 104 and the communication module 2. For example, the USB communication unit 104 transmits data designated by the controller 102 to an external communication network via the communication module 2. The USB communication unit 104 receives data from the external communication network via the communication module 2. The USB communication unit 104 outputs the received data to the controller 102. Here, the USB communication unit 104 synchronizes data transmission at the interval of 1 millisecond using the SOF packet.

Meanwhile, when the switch 17 is selecting the USB communication unit 14 as a connection destination of the communication module 2, the USB communication unit 104 does not perform data transmission.

In the case of the switching to the USB communication unit 14, the USB communication unit 104, upon receiving from the controller 102 a notification requesting the switching, outputs data received from the communication module 2 to the synchronization controller 105 as well as to the controller 102.

Meanwhile, in the case of the switching to the USB communication unit 104, the USB communication unit 104 performs reset operation, under control of the synchronization controller 105, at the time when the USB communication unit 14 receives the SOF, so that the USB communication unit 104 is synchronized with the communication module 2. Thereafter, the USB communication unit 104 is virtually connected to a virtual communication module built within the common memory 110, as will be described later. That is, the USB communication unit 104 is in a state in which data is allowed to be transmitted between the USB communication unit 104 and the virtual communication module built in the common memory 110. The USB communication unit 104 receives from the controller 102 an instruction to provide a pseudo USB response for the virtual communication module. In response to this instruction, the USB communication unit 104 writes the pseudo USB response in the data transfer area 205 of the common memory 110. The USB communication unit 104 monitors the notification area 201 and determines whether a pseudo response from the controller 12 of the information processing device 1 main body has been written in the notification area 201. When the pseudo response has been written in the notification area 201, the USB communication unit 104 reads the pseudo response. The USB communication unit 104 determines whether a communication link between the USB communication unit 104 and the virtual communication module has been normally established or not. When it is determined that the communication link has been normally established, the USB communication unit 104 issues a notification indicating completion of the synchronization, to the controller 102.

In the case of the switching to the USB communication unit 14, the synchronization controller 105 receives a synchronization instruction from the controller 102. The synchronization controller 105 receives a USB descriptor for the communication module 2, from the controller 102, and writes the received USB descriptor in the synchronization area 220 of the common memory 110. Thus, a virtual communication module is built within the common memory 110.

Next, the synchronization controller 105 inputs, from the USB communication unit 104, data that has been received via the communication module 2, and writes the inputted data in the data transfer area 205 of the common memory 110.

Meanwhile, in the case of the switching to the USB communication unit 104, the synchronization controller 105 receives a synchronization instruction from the controller 102. The USB communication unit 104 monitors the data transfer area 205 of the common memory 110, based on the synchronization instruction. Then, the synchronization controller 105 refers to the SOF of the data written in the data transfer area 205, resets the USB communication unit 104 upon receiving the SOF, and synchronizes the USB communication unit 104 to the communication module 2.

In the case of the switching to the USB communication unit 14, the protocol stack setting unit 103 receives an instruction to store communication setting information from the controller 102, and writes the communication setting information in the common memory 110.

Meanwhile, in the case of the switching to the USB communication unit 104, the protocol stack setting unit 103 receives, from the controller 102, an acquisition instruction to acquire communication setting information, and acquires, from the common memory 110, the communication setting information being used by the USB communication unit 14. For example, the protocol-stack setting unit 103 acquires, from the application setting area 202, the application information used for the communication via the communication module 2. The protocol-stack setting unit 103 acquires, from the network setting area 203, network information being used by the USB communication unit 14 when communicating with an external communication network via the communication module 2. The protocol-stack setting unit 103 acquires, from the USB setting area 204, USB information used for controlling the communication module 2 as a USB device. Then, the protocol stack setting unit 103 outputs the acquired communication setting information to the controller 102.

The memory 106 is a storage unit, such as memory and hard disk. An operating system (OS) and applications for providing services such as a PUSH service are stored in the memory 106.

Next, description will be given of an operation of the controller 102 when the switch 17 is selecting the USB communication unit 104 as a connection destination of the communication module 2. The controller 102 inputs data from the USB communication unit 104, and processes the data using, for example, the memory 106. Further, the controller 102 outputs data to the USB communication unit 104 when the data is required to be transmitted to an external communication network.

When a switching factor, such as start-up of the information processing device 1, has occurred in a state in which the switch 17 is selecting the USB communication unit 104 as a connection destination of the communication module 2, the controller 102 starts up the controller 12 that has been in a shutdown or standby mode. At the same time, the controller 102 notifies the USB communication unit 104 of an instruction to request the switching, and notifies the synchronization controller 105 of a synchronization instruction. Further, the controller 102 notifies protocol stack setting unit 103 of an instruction to store the communication-setting information.

The controller 12 monitors the notification area 201 of the common memory 110, and determines whether a notification indicating completion of synchronization setting has been written by the controller 102 of the remote-controlled communication device 100.

The controller 102 monitors the synchronization area 220 of the common memory 110 and determines whether a USB response has been written by the USB communication unit 14 of the information processing device 1 main body. When the USB response has been written in the synchronization area 220, the controller 102 writes a pseudo response in the synchronization area 220. Thereafter, the controller 102 monitors the notification area 201 of the common memory 110 and determines whether a notification indicating completion of synchronization has been written by the controller 12. Further, the controller 102 monitors the notification area 201 of the common memory 110 and determines whether the notification requesting the switching has been written in the notification area 201. When the notifications indicating the completion of synchronization and requesting the switching are written, the controller 102 outputs, to the switching controller 101, an instruction to switch the connection destination of the communication module 2 from the USB communication unit 104 to the USB communication unit 14.

Next, description will be given of an operation of the controller 102 when the switch 17 is selecting the USB communication unit 14 as a connection destination of the communication module 2. In this case, since the remote-controlled communication device 100 always stays in a power-on state, the controller 102 is operating. The controller 102 monitors the notification area 201 of the common memory 110. When the controller 12 of the information processing device 1 main body writes a notification requesting the switching in the notification area 201, the controller 102 notifies the protocol stack setting unit 103 of an acquisition instruction to acquire communication setting information. The controller 102 receives the communication setting information from the protocol-stack setting unit 103 as a response to the acquisition instruction.

Upon receiving the communication setting information, the controller 102 acquires USB information from the received communication setting information and sets the USB communication unit 104 based on the acquired USB information. For example, the controller 102 builds, within the USB communication unit 104, a pseudo USB host that operates in the same manner as the USB host implemented in the USB communication unit 14, using the USB information, where the USB information has been used by the USB communication unit 104 and includes, for example, a USB device address, information on an endpoint, and information on a device driver.

Further, the controller 102 acquires network information from the received communication setting information and sets the received network information in the USB communication unit 104. For example, the network information includes an IP address, a port number, session management and PPP connection information.

Further, the controller 102 acquires application information from the received communication setting information and activates the corresponding application. The controller 102 applies the application information to the activated application. For example, the controller 102 sets a PUSH server address, certification information, and a device identifier to the activated application.

After completion of setting the communication setting information mentioned above, the controller 12 writes the notification indicating completion of setting in the notification area 201 of the common memory 110.

Further, the controller 102 notifies the synchronization controller 105 of a synchronization instruction. The controller 102 determines whether the synchronization in the USB communication unit 104 has completed, and writes the notification indicating completion of synchronization in the notification area 201 when the synchronization of the USB communication unit 104 has completed.

Thereafter, the controller 102 registers the USB device by performing a USB enumeration on the communication module 2, where the controller 102 uses the same device address information and endpoint information as those set in the USB communication unit 14.

Thereafter, the controller 102 acquires information on the USB descriptor from the synchronization area 220 of the common memory 110. The controller 102 may recognize the specification of the communication module 2 by acquiring the information on the USB descriptor written in the synchronization area 220. Thus, the controller 102 may create data applicable to the communication module 2 using the USB descriptor of the communication module 2. The controller 102 may write the created data for the communication module 2 in the notification area 201 of the common memory 110. The controller 102 handles the data acquired from notification area 201 of the communication module 2 in the same manner as data acquired from the communication module 2. Thus, the controller 102 may behave as if it communicates with the communication module 2 via the common memory 110. That is, the controller 102 may handle the common memory 110 as a virtual communication module.

The controller 12 notifies the USB communication unit 14 of an instruction to issue a pseudo USB response to the virtual communication module. Thereafter, upon receiving from the USB communication unit 14 the notification indicating the completion of synchronization, the controller 12 writes the notification requesting the switching in the notification area 201.

Thereafter, when the switching to the USB communication unit 104 is completed and the controller 102 receives data from the USB communication unit 104, the controller 102 starts processing on the received data, for example, using the activated application.

The switching controller 101 receives, from the controller 102, a switching-request instruction for switching a connection destination of the communication module 2 from the USB communication unit 14 to the USB communication unit 104. Upon receiving the switching-request instruction, the switching controller 11 controls the switch 17 to select the USB communication unit 104 as a connection destination of the communication module 2.

Figure 3:
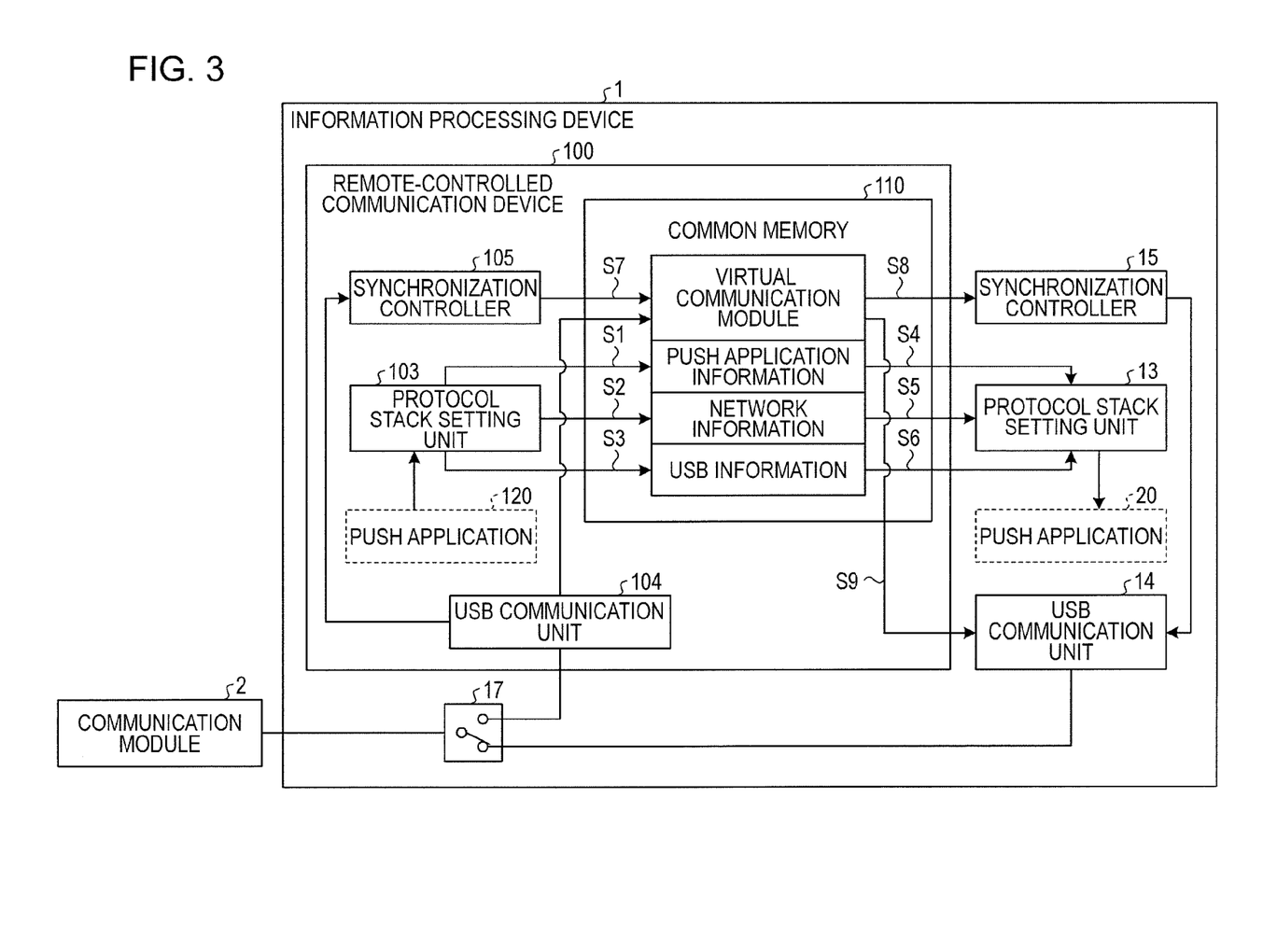
FIG. 3 is a diagram illustrating an example of a data flow sequence for switching a connection destination of a communication module from a remote-controlled communication device to information processing device main body, according to an embodiment.

FIG. 3 is a diagram illustrating an example of a data flow sequence for switching a connection destination of a communication module from a remote-controlled communication device to information processing device main body, according to an embodiment. In FIG. 3, PUSH applications 20 and 120 enclosed by dotted lines indicate applications activated by the controllers 12 and 102, respectively. That is, the PUSH application 20 is implemented using the controller 12 and the memory 16 in FIG. 1, and the PUSH application 120 is implemented using the controller 102 and the memory 106 in FIG. 3.

When a switching factor occurs, for example, when the PC is activated by a user or by the PUSH service, the information processing device 1 is activated.

In sequence S1, the protocol stack setting unit 103 writes, in the common memory 110, PUSH application information that is a type of application information acquired from the PUSH application 120.

In sequence S2, the protocol stack setting unit 103 writes, in the common memory 110, the network information that has been used by the USB communication unit 104.

In sequence S3, the protocol stack setting unit 103 writes, in the common memory 110, the USB information that has been used by the USB communication unit 104.

In sequence S4, the protocol stack setting unit 13 acquires the PUSH application information from the common memory 110, and notifies the PUSH application 20 of the acquired PUSH application information.

In sequence S5, the protocol stack setting unit 13 acquires the network information from the common memory 110.

In sequence S6, the protocol stack setting unit 13 acquires the USB information from the common memory 110.

In sequence S7, the synchronization controller 105 transfers data received from the USB communication unit 104 to the common memory 110, and writes the USB descriptor of the communication module 2 in the common memory 110. In FIG. 3, an arrow from the USB communication unit 104 to the virtual communication module represents the transfer of the data received from the USB communication unit 104 to the common memory 110. Thus, a virtual communication module may be implemented in the common memory 110.

In sequence S8, upon detecting the SOF information that was transferred by the synchronization controller 105 to the common memory 110, the synchronization controller 15 resets the USB communication unit 14, thereby synchronizing the USB communication unit 104 and the USB communication unit 14.

In sequence S9, a virtual connection may be established between the USB communication unit 14 and the virtual communication module that was built in the common memory 110 using the acquired various setting information.

As mentioned above, a virtual communication link is beforehand established between the USB communication unit 14 and the virtual communication module. This allows the USB communication unit 14 to quickly establish a communication link between the USB communication unit 14 and the communication module 2, using the beforehand prepared setting information when the USB communication unit 14 is actually connected to the communication module 2 due to the switching operation of the switch 17. That is, it is unnecessary to set information for establishing a communication link just after the switching operation has been performed, thereby reducing the interruption time of the data transmission.

The above description about FIG. 3 is given about switching a connection destination of the communication module from the USB communication unit 104 of the remote-controlled communication device 100 to the USB communication unit 14 of the information processing device 1 main body. Meanwhile, when a connection destination of the communication module is switched from the USB communication unit 14 of the information processing device 1 main body to the USB communication unit 104 of the remote-controlled communication device 100, a data flow sequence may be performed, in the similar manner, using a virtual communication module built in the common memory 110, except that the direction of the data flow is reversed.

Figure 4:
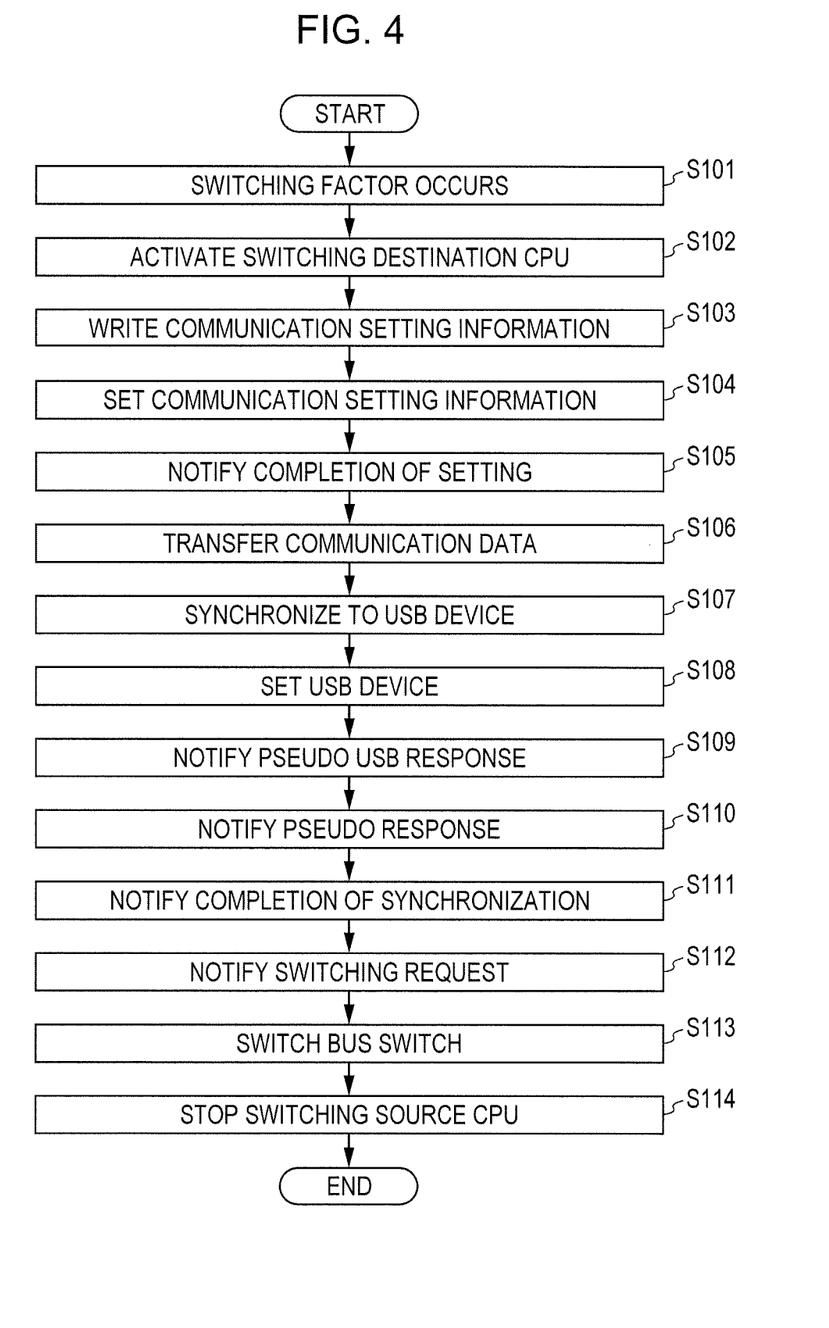
FIG. 4 is a diagram illustrating an example of an operational flowchart for switching a connection destination of a communication module, according to an embodiment.

FIG. 4 is a diagram illustrating an example of an operational flowchart for switching a connection destination of a communication module, according to an embodiment. FIG. 4 illustrates an operational flowchart for switching a connection destination of a communication module from the USB communication unit 104 of the remote-controlled communication device 100 to the USB communication unit 14 of the information processing device 1 main body.

In operation S101, a switching factor, such as shutdown, occurs when the remote-controlled communication device 100 is operating.

In operation S102, the controller 102 of the remote-controlled communication device 100 activates a switching destination CPU provided for the controller 12 of the information processing device 1 main body to which the communication module 2 is to be connected, by supplying power to the switching destination CPU.

In operation S103, the protocol stack setting unit 103 writes, in the common memory 110, communication setting information being used by the USB communication unit 104.

In operation S104, the protocol stack setting unit 13 of the information processing device 1 main body acquires the communication setting information from the common memory 110. The controller 12 of the information processing device 1 main body sets the communication setting information acquired by the protocol stack setting unit 13, in the USB communication unit 14 and other relevant components.

In operation S105, the controller 12 of the main body notifies the completion of setting by writing notification information indicating the completion of setting in the notification area 201 of the common memory 110.

In operation S106, the synchronization controller 105 of the remote-controlled communication device 100 transfers communication data received by the USB communication unit 104 from the communication module 2 into the data transfer area 205 of the common memory 110.

In operation S107, the synchronization controller 15 of the main body synchronizes the USB communication unit 14 to a USB device of the communication module 2, by acquiring the SOF included in the data written in the data transfer area 205.

In operation S108, the controller 12 of the main body sets the communication module 2 as a USB device by performing a USB enumeration on the communication module 2 and registering the communication module 2 as the USB device.

In operation S109, the USB communication unit 14 of the main body notifies the controller 102 of the remote-controlled communication device 100 of a pseudo USB response, such that the USB communication unit 14 writes the notification indicating the pseudo USB response in the notification area 201 of the common memory 110, and the controller 102 acquires the notification indication the pseudo USB response written in the notification area 201.

In operation S110, the controller 102 of the remote-controlled communication device 100 notifies the USB communication unit 14 of the pseudo response such that the controller 102 writes the notification indicating the pseudo response in the notification area 201 of the common memory 110, and the USB communication unit 14 acquires the notification indicating the pseudo response written in the notification area 201.

In operation S111, the controller 12 of the main body issues the notification indicating the completion of synchronization to the controller 102 of the remote-controlled communication device 100 such that the controller 12 writes the notification of the completion of synchronization in the notification area 201 of the common memory 110 when the USB communication unit 14 receives the notification indicating the pseudo response from the controller 102, and the controller 102 acquires the notification indicating the completion of synchronization that was written in the notification area 201.

In operation S112, the controller 12 issues the notification requesting the switching to the controller 102 such that the controller 12 writes the notification requesting the switching in the notification area 201 of the common memory 110, and the controller 102 acquires the notification requesting the switching written in the notification area 201.

In operation S113, the controller 102, upon receiving the notification requesting the switching, notifies the switching controller 101 of an instruction to switch a bus switch of the switch 17, and the switching controller 101 controls the switch 17 so that the bus switch is connected to the USB communication unit 14.

In operation S114, a switching source CPU provided for the remote-controlled communication device 100 is stopped.

Figure 5:
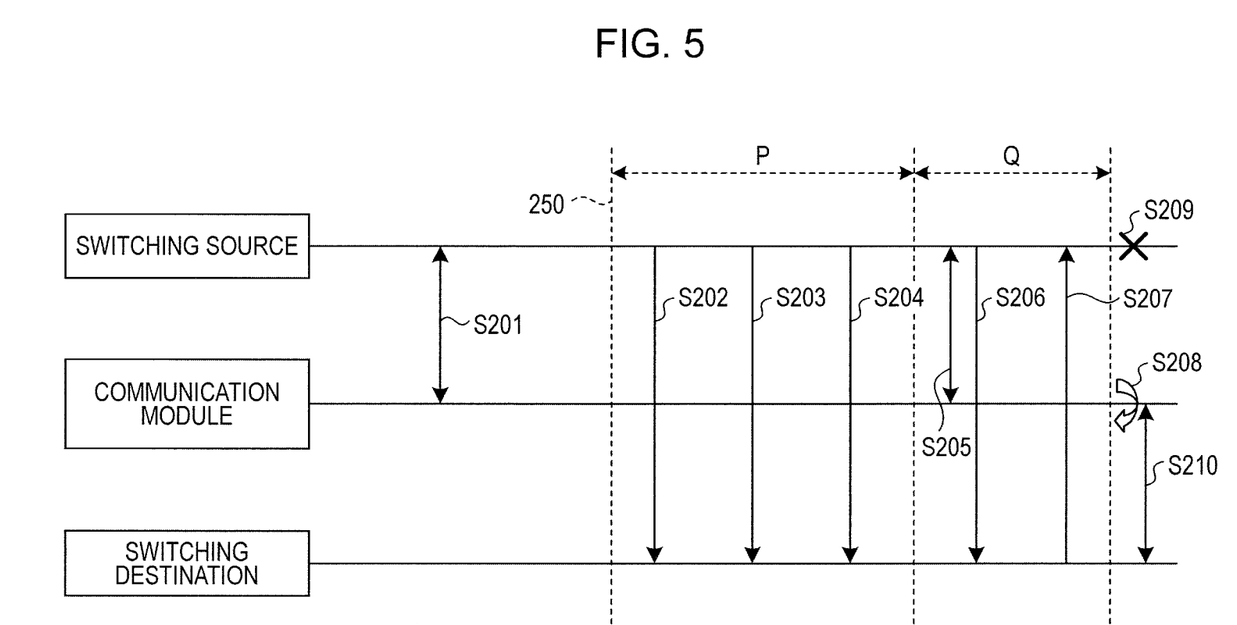
FIG. 5 is a diagram illustrating an example of a transmission sequence for performing a switching process, according to an embodiment.

FIG. 5 is a diagram illustrating an example of a transmission sequence for performing a switching process, according to an embodiment. FIG. 5 illustrates a data flow for performing a switching operation among the switching source, the switching destination, and the communication module 2. Here, a data flow is indicated by an arrow connecting a pair of lines each extending from one of the switching source, the communication module 2, and the switching destination. In FIG. 5, it is assumed that time goes on in a direction from the left to the right.

In sequence S201, data transmission is being performed between the switching source and the communication module 2. Here, it is assumed that a switching factor has occurred at the time denoted by a dotted line 250.

In sequence S202, application information is notified from the switching source to the switching destination so that the corresponding application is set in the switching destination based on the notified application information.

In sequence S203, network information is notified from the switching source to the switching destination so that the corresponding network is set in the switching destination based on the notified network information.

In sequence S204, USB information is notified from the switching source to the switching destination so that the corresponding USB is set in the switching destination based on the notified USB information.

Transmission sequences during a time period denoted by "P" are performed by the protocol stack setting unit 13 and the protocol stack setting unit 103.

In sequences S205 and S206, when a virtual communication module is built in the common memory 110, data that is transmitted between the switching source and the communication module is transferred from the switching source to the switching destination via a common memory. Thus, the switching destination and the communication module 2 are synchronized with each other.

In sequence S207, an instruction requesting the switching is notified from the switching destination to the switching source.

In sequence S208, the switch 17 switches a connection destination of the communication module 2 from the switching source to the switching destination.

In sequence S209, the communication link between the communication module 2 and the switching source is disconnected.

Here, transmission sequences during a time period denoted by "Q" are performed by the synchronization controllers 15, 105, and the controllers 12, 102.

In sequence S210, data transmission is performed between the switching destination and the communication module 2.

Figure 6:
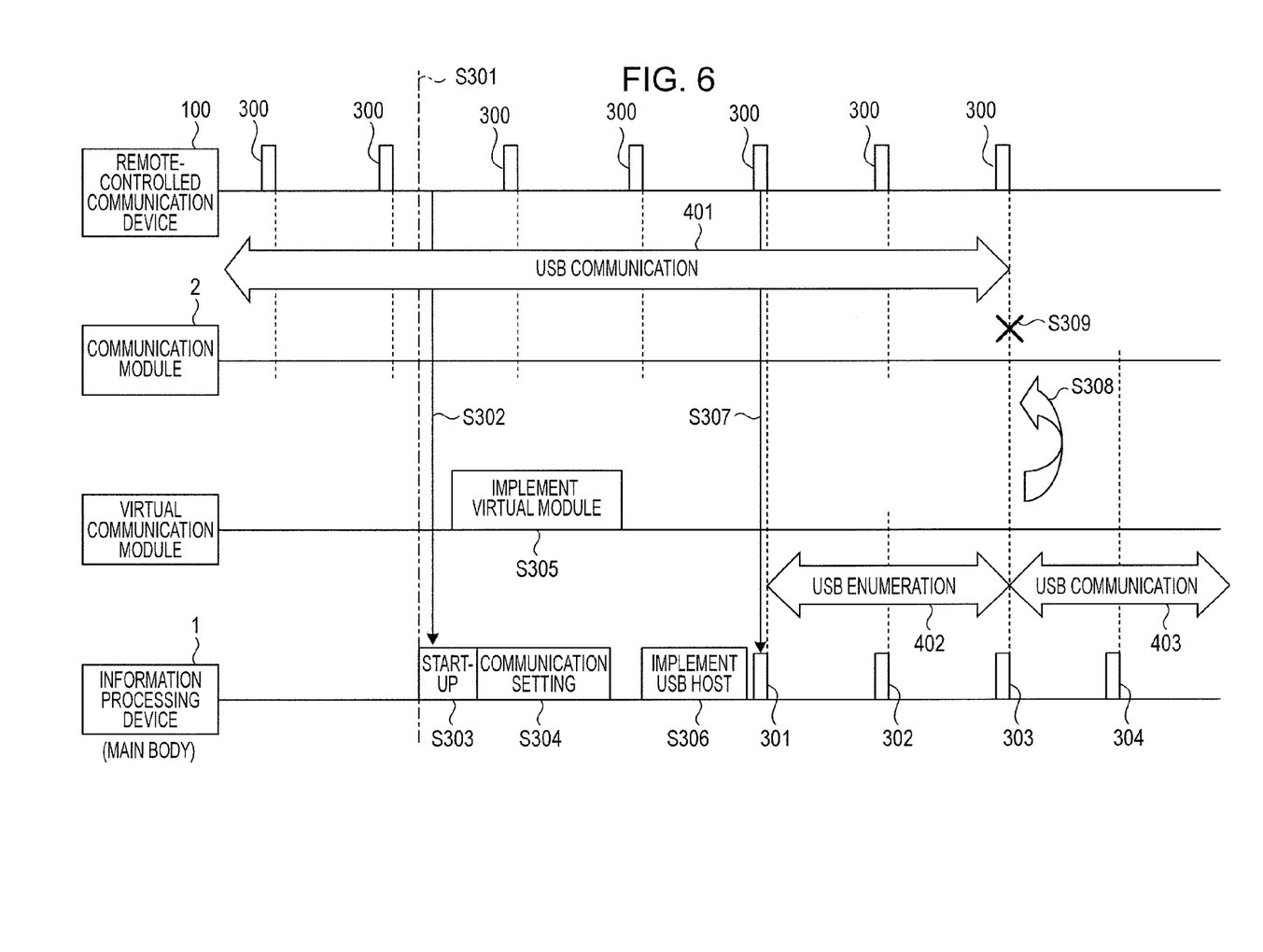
FIG. 6 is a schematic diagram illustrating an example of an operational sequence for switching a connection destination, according to an embodiment.

FIG. 6 is a schematic diagram illustrating an example of an operational sequence for switching a connection destination, according to an embodiment. In FIG. 6, a connection destination of the communication module 2 is switched from the USB communication unit 104 of the remote-controlled communication device 100 to the USB communication unit 14 of the information processing device 1 main body. Here, the information processing device 1 depicted in FIG. 6 represents the main body of the information processing device 1.

The remote-controlled communication device 100, upon receiving each of SOFs 100, synchronizes with the communication module 2 using the received each SOF 300.

In sequence S301, a switching factor occurs, for example, the information processing device 1 main body is started up at the time denoted by the dashed-dotted line.

In sequence S302, the remote-controlled communication device 100 supplies power to the information processing device 1 and notifies the information processing device 1 of communication setting information.

In sequence S303, the information processing device 1 main body is started up when the power is supplied.

In sequence S304, the information processing device 1 performs various types of communication setting based on the notified communication setting information.

In sequence S305, in parallel with the above sequence S304, the remote-controlled communication device 100 writes the USB descriptor in the common memory 110 to build a virtual communication module.

In sequence S306, the USB host for the communication module 2 is implemented in the information processing device 1 main body.

In sequence S307, the remote-controlled communication device 100 transfers the received SOF 300 to the information processing device 1 main body via the common memory 110 so that the information processing device 1 main body acquires the SOFs 301 to 303. Upon receiving the SOFs 301 to 303, the information processing device 1 resets the USB communication unit 14, thereby synchronizing the USB communication unit 14 to the communication module 2. That is, the information processing device 1 performs a USB enumeration in a time period denoted by an arrow 402.

In sequence S308, after the completion of the USB enumeration, the USB communication unit 14 of the information processing device 1 switches a connection destination from the virtual communication module to the communication module 2. At the same time, the communication link between the USB communication unit 104 of the remote-controlled communication device 100 and the communication module 2 is disconnected (in sequence S309).

Thereafter, the information processing device 1 main body, upon acquiring the SOF denoted by the SOF 304, synchronizes to the communication module 2, and performs the USB communication with the communication module 2.

That is, the remote-controlled communication device 100 performs a USB communication with the communication module during a first time period (denoted by an arrow 401), and the information processing device 1 performs the USB enumeration during a second time period (denoted by 402) included in the first time period (denoted by 401). Then, the information processing device 1 performs the USB communication with the communication module during a third time period (denoted by an arrow 403) just after the second time period. Accordingly, as illustrated in FIG. 6, there exists no time lugs between the first and third time periods (denoted by arrows 401 and 403, respectively), and the communication between the communication module and the information processing device 1 (including the remote-controlled communication device 100) is not interrupted even when the switching is performed.

Figure 7:
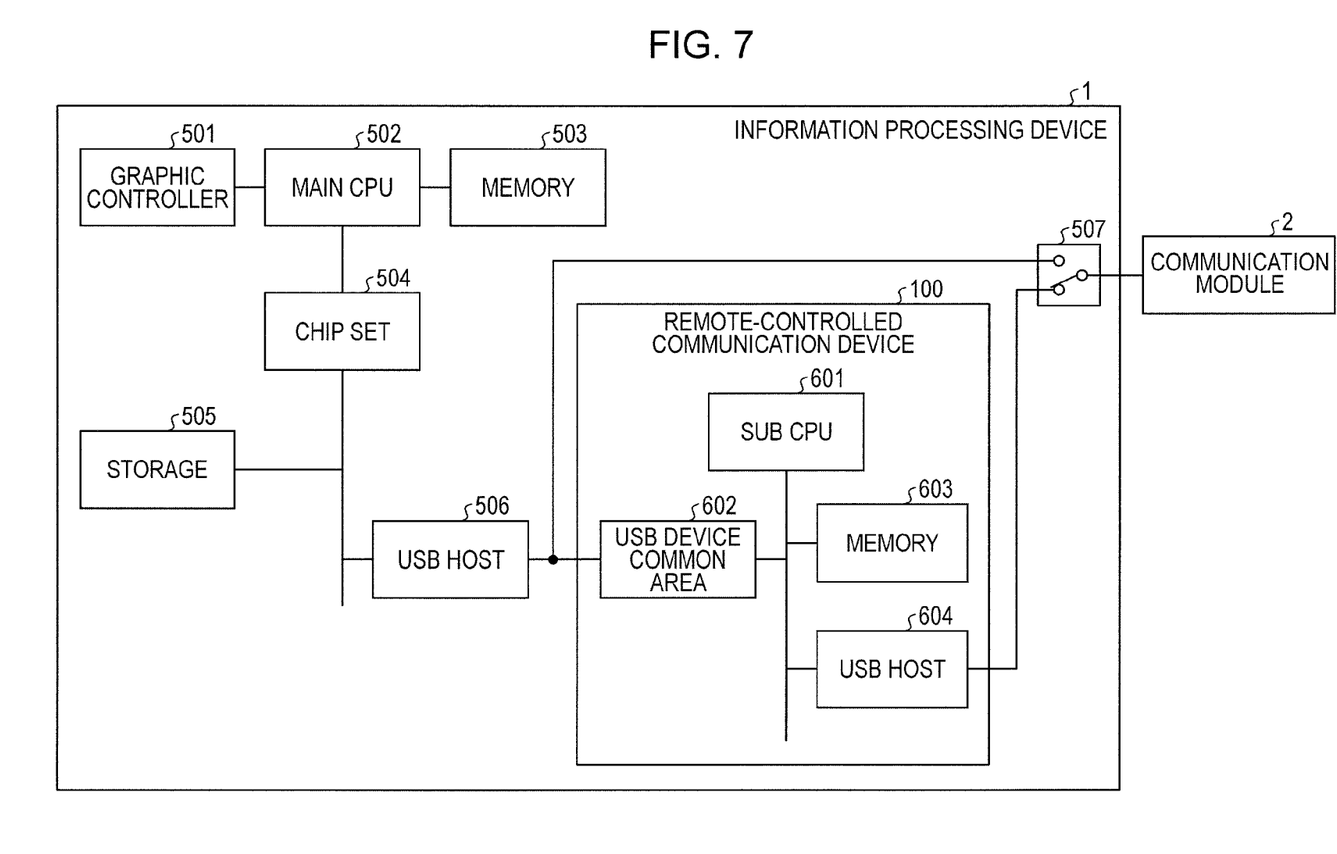
FIG. 7 is a diagram illustrating an example of a hardware configuration of an information processing device, according to an embodiment.

FIG. 7 is a diagram illustrating an example of a hardware configuration of an information processing device, according to an embodiment. As illustrated in FIG. 7, the information processing device 1 may be configured to include, for example, a graphic controller 501, a main CPU 502, a memory 503, a chip set 504, a storage 505, a USB host 506, a bus switch 507, and the remote-controlled communication device 100.

The remote-controlled communication device 100 may include a sub CPU 601, a USB device common area 602, a memory 603, and a USB host 604.

The graphic controller 501, the memory 503, and the chip set 504 are connected to the main CPU 502 via a bus. The chip set 504 is connected, via the bus, to the storage 505 and the USB host 506. The USB host 506 is connected, via the bus, to the USB device common area 602 and the bus switch 507.

The storage 505 and the memory 503 may serve as the memory 16 illustrated in FIG. 1. The storage 505 may be configured to store an operating system (OS), an application for providing the PUSH service, and the like.

The main CPU 502, the chip set 504, and the memory 503 may serve as, for example, the switching controller 11, the controller 12, the protocol stack setting unit 13, and the synchronization controller 15, as illustrated in FIG. 1. For example, the memory 503 may store various programs for implementing the functions performed by the switching controller 11, the controller 12, the protocol stack setting unit 13, and synchronization controller 15, as illustrated in FIG. 1. The main CPU 502 and the chip set 504 create processes for performing the above-mentioned functions by reading and executing these programs.

The USB host 506 may implement the function of the USB communication unit 14 illustrated in FIG. 1. The graphic controller 501 may display the various types of data, such as the execution result of the process on a monitor (not depicted in FIG. 7).

The bus switch 507 implements the function of the switch 17 illustrated in FIG. 1. The bus switch 507 is connected to the communication module 2. Further, the bus switch 507 is selectively connected to one of the USB host 506 and the USB host 604.

The USB device common area 602, the memory 603, and the USB host 604 are connected to the sub CPU 601 via the bus. The main CPU 502 may access the USB device common area 602 via the USB host 506, and the sub CPU 601 may access the USB device common area 602 via the USB host 604.

The USB device common area 602 implements the common memory 110. The sub CPU 601 and the memory 603 implement the functions of, for example, the switching controller 101, the controller 102, the protocol stack setting unit 103, and the synchronization controller 105 as illustrated in FIG. 1. For example, the memory 603 may store various programs for implementing the functions to be performed by the switching controller 101, the controller 102, the protocol stack setting unit 103, and the synchronization controller 105, as illustrated in FIG. 1. The sub CPU 601 reads and executes these programs to generate a process for implementing the above-mentioned functions. The sub CPU 601 may be operated independently from the main CPU 502 of the information processing device 1. That is, the sub CPU 601 may be operated even when the main CPU 502 is not operating.

The USB host 604 and the USB host 506 implement the functions of the USB communication unit 104 and the USB communication unit 14 illustrated in FIG. 1, respectively.

As described above, when a connection destination of the USB device is switched from the communication unit of the information processing unit main body to the communication unit of the remote-controlled communication device and vice versa, the information processing device according to the embodiment builds a virtual communication module before the switching is performed. The information processing device beforehand prepare communication setting information used for establishing a communication link to an actual USB device, by virtually connecting the communication unit of the switching destination to the virtual communication module. After the switching is completed, the information processing device establishes the communication link to the actual USB device, using the communication setting information that was beforehand prepared. Therefore, it is unnecessary to prepare the communication setting information for the USB device after the switching has completed. This allows a connection destination of the USB device to be switched from the communication unit of the information processing unit main body to the communication unit of the remote-controlled communication device and vice versa, without any temporal interruption of data transmission that is caused by re-establishing the communication link. Consequently, even when a switching operation has occurred in response to the operational conditions, such as the start-up and the shutdown of the information processing device, it is possible to keep providing services such as the PUSH service, thereby enhancing the quality of the services to be provided.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An apparatus for switching connection to a communication network, the apparatus comprising:
 a first processor configured to:
  execute an operating system,
  connect to the communication network, and
  communicate with the communication network;
 a second processor configured to:
  operate independently of the operating system,
  connect to the communication network, and
  communicate with the communication network;
 a common memory configured to store communication setting information for setting protocol layers used for communication between the communication network and each of the first and second processors; and
  a switch configured to switch a connection destination of the communication network from one of the first and second processors to the other one of the first and second processors, wherein
 when the connection destination of the communication network is switched from the second processor to the first processor, the second processor writes, in the common memory, the communication setting information that has been used for communication between the second processor and the communication network, the first processor:
 acquires, from the common memory, the communication setting information written by the second processor,
 sets the acquired communication setting information to the first processor, and
 establishes a pseudo communication for simulating establishment of a communication link between the first processor and the communication network, according to the communication setting information, by using the common memory as a communication module for communicating with the communication network, and
 the switch switches the connection destination of the communication network from the second processor to the first processor having the communication setting information for which the pseudo communication has been established so that the first processor quickly establishes the communication link with the communication network; and
 wherein the first processor performs the pseudo communication by:
 writing information in the common memory when the communication setting information of the second processor is set to the first processor, and
 reading, when response information responsive to the written information is written in the common memory, the response information from the common memory;
 the first processor determines whether the pseudo communication is established or not;
 the second processor writes the response information responsive to the information that was written in the common memory by the first processor; and
 the switch switches the connection destination from the second processor to the first processor when the first processor determines that the pseudo communication is established.

2. The apparatus of claim 1, wherein
 the first and second processor is configured to connect to the communication network via a universal serial bus (USB) interface, and
 the second processor is configured to write, in the common memory, the communication setting information that includes at least USB setting information and network setting information.

3. The apparatus of claim 1, wherein
 the second processor writes, in the common memory, information received from the communication network when the switch switches the connection destination from the second processor to the first processor; and
 the first processor synchronizes with data transmission of the communication network based on information that is written in the common memory by the second processor.

4. The apparatus of claim 1, wherein, when the switch switches the connection destination from the first processor to the second processor,
 the first processor writes, in the common memory, the communication setting information being used by the first processor;
 the second processor acquires the communication setting information that is being used by the first processor and written into the common memory by the first processor;
 the second processor sets the acquired communication setting information to the second processor; and
 the switch switches the connection destination from the first processor to the second processor after the second processor sets the acquired communication setting information to the second processor.

5. A method for switching connection to a communication network, the method being performed by an apparatus including first and second processors, a common memory, and a switch, the first processor executing an operating system and the second processor operating independently of the operating system, the first and second processors each connected to the communication network and communicating with the communication network, the common memory being configured to store communication setting information for setting protocol layers used for communication between the communication network and each of the first and second processors, the method comprising:
 when a connection destination of the communication network is switched from the second processor to the first processor, causing the second processor to write the communication setting information that has been used for communication between the second processor and the communication network into the common memory;
 causing the first processor to:
 acquire, from the common memory, the communication setting information written by the second processor,
 set the setting information for which the pseudo communication has been established to the first processor so that the first processor quickly establishes the communication link with the communication network, and
 establish a pseudo communication for simulating establishment of a communication link between the first processor and the communication network, according to the communication setting information, by using the common memory as a communication module for communicating with the communication network; and
 causing the switch to switch the connection destination of the communication network from the second processor to the first processor having the communication setting information for which the pseudo communication has been established so that the first processor quickly establishes the communication link with the communication network; and wherein the first processor performs the pseudo communication by:

writing information in the common memory when the communication setting information of the second processor is set to the first processor, and reading, when response information responsive to the written information is written in the common memory, the response information from the common memory;

the first processor determines whether the pseudo communication is established or not;

the second processor writes the response information responsive to the information that was written in the common memory by the first processor; and the switch switches the connection destination from the second processor to the first processor when the first processor determines that the pseudo communication is established.

* * * * *